United States Patent
Dell et al.

(10) Patent No.: US 12,246,581 B2
(45) Date of Patent: Mar. 11, 2025

(54) FLOW-DIRECTING ELEMENT, FLOW-DIRECTING SYSTEM AND HEATING APPARATUS

(71) Applicant: Webasto SE, Stockdorf (DE)

(72) Inventors: Vitali Dell, Stockdorf (DE); Christian Schweyer, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 11 days.

(21) Appl. No.: 17/788,580

(22) PCT Filed: Dec. 2, 2020

(86) PCT No.: PCT/EP2020/084297
§ 371 (c)(1),
(2) Date: Jun. 23, 2022

(87) PCT Pub. No.: WO2021/130000
PCT Pub. Date: Jul. 1, 2021

(65) Prior Publication Data
US 2023/0051497 A1     Feb. 16, 2023

(30) Foreign Application Priority Data
Dec. 24, 2019   (DE) .................... 10 2019 135 786.1

(51) Int. Cl.
*B60H 1/22*     (2006.01)
*B60H 1/00*     (2006.01)
(Continued)

(52) U.S. Cl.
CPC ....... *B60H 1/2203* (2013.01); *B60H 1/00314* (2013.01); *F23D 3/40* (2013.01); *F23L 1/02* (2013.01); *F23D 2900/21002* (2013.01)

(58) Field of Classification Search
USPC ........................................... 431/258
See application file for complete search history.

(56) References Cited

U.S. PATENT DOCUMENTS

| 6,321,870 B1 | 11/2001 | Waronitza et al. |
| 2012/0104109 A1* | 5/2012 | Wetzl .......... F23Q 7/06 237/12.3 C |

(Continued)

FOREIGN PATENT DOCUMENTS

| DE | 19507556 A1 | 4/1996 |
| DE | 102007030606 A1 | 1/2009 |

(Continued)

OTHER PUBLICATIONS

PCT International Search Report and Written Opinion, PCT/EP2020/084297, Feb. 18, 2021, 20 pages.

*Primary Examiner* — Steven B Mcallister
*Assistant Examiner* — John E Bargero
(74) *Attorney, Agent, or Firm* — Quarles & Brady LLP

(57) ABSTRACT

A flow-directing element for a heating apparatus, in particular a heating apparatus with an evaporator burner, having a body which comprises a laterally arranged inflow region on an underside of the flow-directing element, having a centrally arranged outflow region, which includes a through-passage from an underside of the flow-directing element to an upper side of the flow-directing element, the upper side being located opposite the underside, and having at least one guide element, which is arranged such that it allows flow to be guided from the inflow region to the outflow region.

16 Claims, 7 Drawing Sheets

(51) Int. Cl.
*F23D 3/40* (2006.01)
*F23L 1/02* (2006.01)

(56) References Cited

U.S. PATENT DOCUMENTS

| | | | |
|---|---|---|---|
| 2015/0028118 A1* | 1/2015 | Panterott | B60H 1/2203 237/12.3 C |
| 2015/0107458 A1* | 4/2015 | Werni | F01N 3/0211 96/380 |
| 2020/0182456 A1* | 6/2020 | Humburg | F23L 9/00 |

FOREIGN PATENT DOCUMENTS

| | | |
|---|---|---|
| DE | 102011084868 A1 | 4/2013 |
| DE | 102012100173 B4 | 9/2014 |
| DE | 102013214387 A1 | 1/2015 |
| EP | 1029723 A2 | 8/2000 |
| EP | 1860379 A2 | 11/2007 |

* cited by examiner

Prior Art

FLOW-DIRECTING ELEMENT, FLOW-DIRECTING SYSTEM AND HEATING APPARATUS

CROSS-REFERENCE TO RELATED APPLICATIONS

This application represents the national stage entry of PCT International Patent Application No. PCT/EP2020/084297 filed on Dec. 2, 2020 and claims priority to German Patent Application No. 10 2019 135 786.1 filed on Dec. 24, 2019. The contents of each of these applications are hereby incorporated by reference as if set forth in their entirety herein.

DESCRIPTION

The disclosure relates to a flow-directing element, a flow-directing system and a heating apparatus, in particular a mobile heating apparatus for vehicles.

Figure 1:
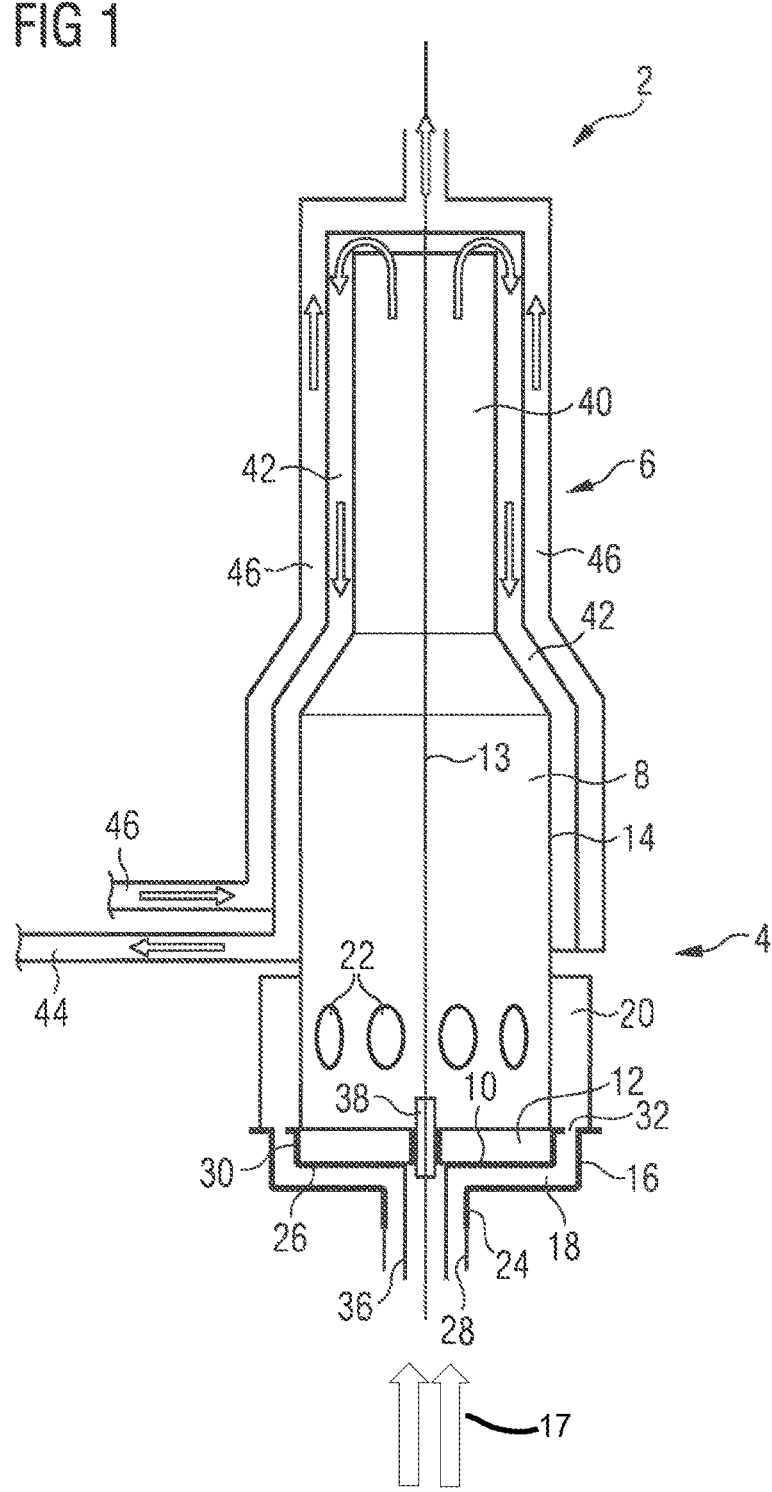

Heating apparatuses with an evaporator burner are used in independent vehicle heaters and/or auxiliary heaters operated with liquid fuel, which are used in particular for vehicles. FIG. 1 shows a heating apparatus with an evaporator burner according to the state of the art as described in DE 10 2012 100 173 B4. This heating apparatus 2 is designed as a mobile, fuel-powered heating apparatus for an independent vehicle heater of a motor-driven land vehicle. The evaporator burner 4 itself has, among other things, a combustion chamber 8, an evaporator receptacle 10 and an evaporator element 12 for evaporating liquid fuel. Combustion chamber 8, evaporator receptacle 10 and evaporator element 12 are designed to be substantially rotationally symmetric. The combustion chamber 8 is bounded in the peripheral direction by a circumferential combustion chamber wall 14. On the front side in the region of the fuel supply, which is given by a fuel supply tube 36 and a combustion air inlet 24, the combustion chamber 8 is bounded by the evaporator receptacle 10. The evaporator receptacle 10 accommodates the evaporator element 12 on the side facing the combustion chamber 8. The evaporator burner 4 further has a combustion air guide element 16 on the side of the evaporator receptacle 10 facing away from the combustion chamber 8, which receives air from a blower 17. The combustion air guide element 16 is bowl-shaped and is fitted over the evaporator receptacle 10 in a manner similar to a cap.

A combustion air vestibule 20 is formed in a ring-shaped manner around the combustion chamber 8. A gap 18 between bottom wall 26 and evaporator receptacle 10 opens into the combustion air vestibule 20. From the combustion air vestibule 20, fluid communication is in turn established with the combustion chamber 8 via combustion air passage openings 22 formed in the combustion chamber wall 14. The gap 18 between the bottom wall 26 of the evaporator receptacle 10 and the combustion air guide element 16 extends continuously over the entire area of the bottom wall 26 (except for the area of the combustion air inlet 24), so that the bottom wall 26 is cooled over substantially its entire area (except for a central area).

The fuel supply tube 36 is disposed within the spigot-shaped combustion air inlet 24 so that, in use, combustion air flows around it and is thereby cooled to prevent the fuel from being prematurely vaporized and ignited directly upon entry into the evaporator element 12, which can cause the combustion to pulse. A first flow path 42 for the exhaust gases is formed in a heat exchanger 6. The exhaust gases flow within the heat exchanger 6 along the first flow path 42 to an exhaust gas discharge 44, through which the exhaust gases are discharged to the outside. Furthermore, a second flow path 46 is provided within the heat exchanger 6 in which cooling fluid of the motor vehicle is guided. The first 42 and the second 46 flow paths are arranged in such a way that, in use, heat is effectively transferred from the exhaust gases to the cooling fluid.

For assembly reasons, the bell-shaped combustion air guide element 16 must be interrupted at at least one point. This interruption can be used to arrange a fuel supply tube 16 or a glow pin of the burner.

Disadvantageous about the previous described solution is that the bowl-shaped geometry limits the size of an evaporator receptacle as far as a blower vestibule is given. Furthermore, such a flow element can only be arranged, centered and fixed on the burner with great effort. Due to the proximity to the hot burner parts, only a limited selection of materials can be considered here.

Furthermore, in particular with an eccentric blower, there is the problem that the air is guided laterally into the heating apparatus at one point and uniform cooling can thus not be realized or can only be realized with great effort.

The object of the disclosure is to specify an improved flow-directing element, flow-directing system and an improved heating apparatus, in particular a mobile heating apparatus for vehicles.

The object of the disclosure is solved with respect to the flow-directing element by the features of claim 1, with respect to the flow-directing system by the features of claim 7 and with respect to the heating apparatus by the features of claim 9. Useful embodiments result from the respective dependent claims.

The flow-directing element according to the disclosure for a heating apparatus, in particular a heating apparatus with an evaporator burner, comprises a body which has a laterally arranged inflow region on a underside of the flow-directing element, a centrally arranged outflow region which comprises a through-passage from an underside of the flow-directing element to an upper side of the flow-directing element opposite the underside, and at least one guide element which is arranged in such a way that it allows flow to be guided from the inflow region to the outflow region.

The underside and the upper side of the flow-directing element are two opposite sides of the flow-directing element. In this context, the underside is expediently designed with a bearing surface, and the upper side is designed to be aligned towards an evaporator burner receptacle in a state installed in the heating apparatus. An outer shape, in particular seen in projection onto the upper side of the flow-directing element is adapted to the shape of the receiving heating apparatus, in particular a combustion air vestibule. The flow-directing element according to the disclosure is particularly suitable for a heating apparatus with a blower arranged outside a central axis, i.e. eccentrically. The flow-directing element thus guides an air flow from the blower to the central outflow region in a simple and cost-effective manner.

The air guide elements can expediently be formed by protrusions or walls arranged on the underside of the flow-directing element, so that channels open towards the underside are formed on the flow-directing element. Alternatively, the flow-directing elements may be formed by closed channels.

Expediently, the flow-directing element is a molded plastic part, in particular an injection-molded plastic part. Such a molded plastic part is inexpensive to manufacture and simplifies assembly. Suitable plastics include, for example, polyphenylene sulfite (PPS) or PPS reinforced with glass fibers, in particular PPS GF 40. In a further embodiment, the flow-directing element is formed at least partially or exclusively from a metallic material or is formed from metallic material and one of the aforementioned plastics.

In one embodiment, the flow-directing element has a recess for inserting a glow plug, which is arranged in particular on a side opposite the inflow region.

In a further embodiment, the inflow region is designed to accommodate a blower, wherein the inflow region is designed in particular as a bulge. The bulge is curved towards the upper side of the flow-directing element. The underside of the bulge is open.

The guide element or elements are expediently designed to expand the air flow from the inflow region to the outflow region in a fan-like manner, and/or to divide the air flow from the inflow region and guide a first part to the outflow region and guide a further part around the outflow region in the peripheral direction and then guide it radially inwards to the outflow region at one or more openings. The one or more guide elements can be used to create a specific flow profile. In order to guide a part of the air flow in the peripheral direction, a circumferential wall at the outflow region, which has one or more apertures, can be provided.

In a further embodiment, the flow-directing element has recesses on a side facing away from the guide element or elements, i.e. the upper side of the flow-directing element, for insertion of a fastening element for fixing in a blower vestibule of an evaporator burner.

The flow-directing system according to the disclosure for a heating apparatus, in particular a heating apparatus with an evaporator burner, comprises a flow-directing element according to the disclosure and a fastening element. The fastening element can be used to fasten the flow-directing element in a simple manner in the heating apparatus, in particular a blower vestibule or burner vestibule. In a first embodiment, the fastening element is suitable for being clamped against the wall of the blower vestibule or combustion vestibule in order to fasten the flow-directing element and fix it in a fixed position. For this purpose, the fastening element can have protrusions which engage in the recesses of the wall or are supported against a smooth wall. Alternatively or additionally, the fastening element is suitable for the flow-directing element being clamped in such a way that the flow-directing element itself is clamped against the blower vestibule or combustion vestibule.

In an embodiment, the fastening element is a spring element, in particular a spring element formed from a spring steel, preferably in one piece. In a further embodiment, the spring element is formed at least partially from plastic, from spring steel and plastic or exclusively from plastic. In particular, such a spring element may have two, three, four or more protrusions toward a circumferential wall and an equal number of tongues directed inwardly toward the outflow region of the flow-directing element. In an embodiment, the spring element does not have a closed shape in the peripheral direction, but an opening which can be used to bring the fastening element into position by means of a deformation. This opening is in particular aligned with a recess of the flow-directing element. The flow-directing element has recesses, in particular on the upper side, into which the fastening element is inserted, and which are designed, in particular for the tongues and/or protrusions, in such a way that the flow-directing element and fastening element fit together in exactly one orientation. Furthermore, the fastening element, in particular the spring element, in particular the tongues of the spring element can be configured to come into contact with an evaporator burner receptacle or evaporator holder, in particular a bottom-side protrusion of the evaporator burner receptacle or evaporator holder, in the installed state. The spring element can be advantageously clamped by the pressure of the bottom-side protrusion on the tongues.

The heating apparatus according to the disclosure, comprising an evaporator combustor with a blower vestibule and an eccentric blower, comprises a flow-directing system according to the disclosure.

In an embodiment, the flow-directing element is received in the blower space in a self-centering manner.

Figure 2:
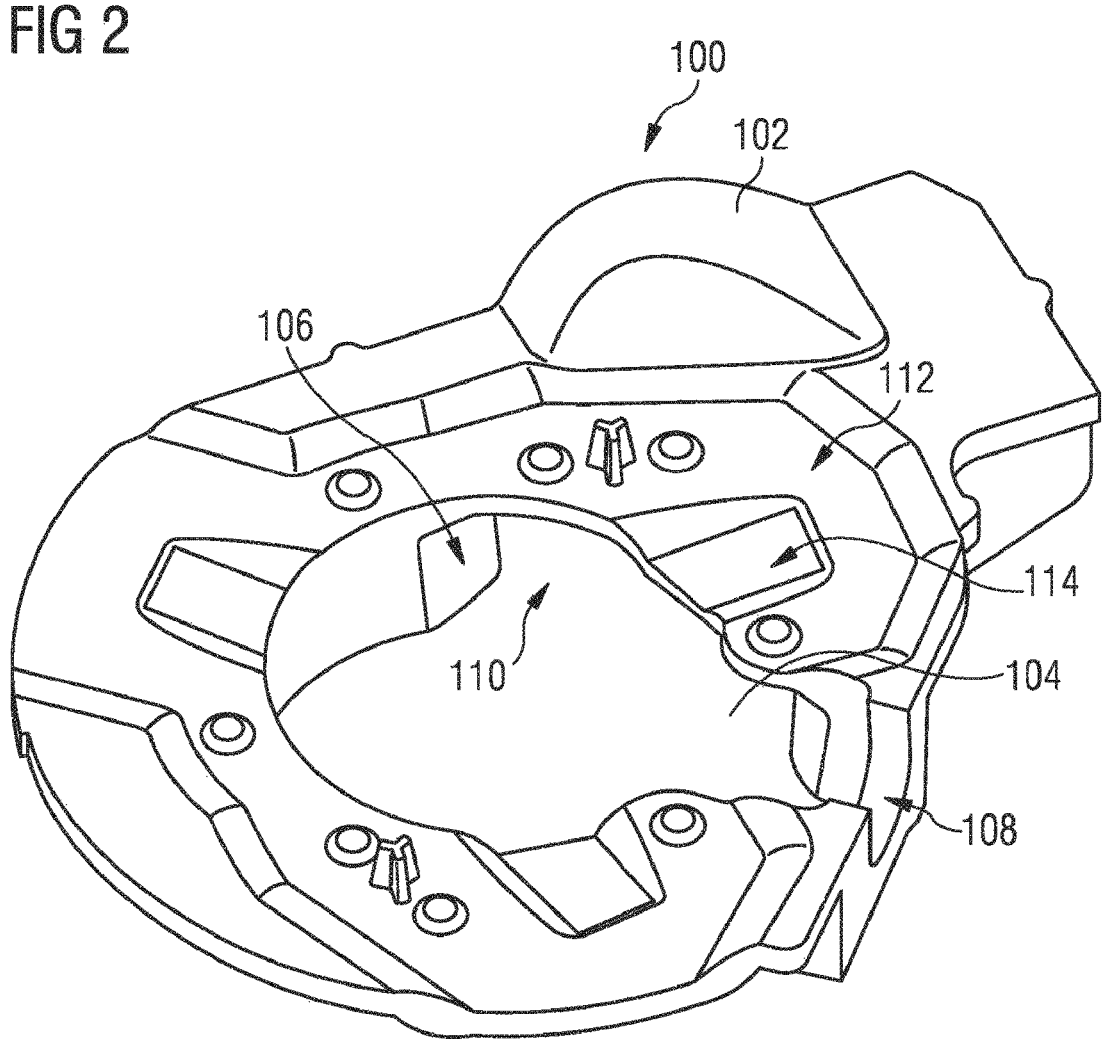
Figure 3:
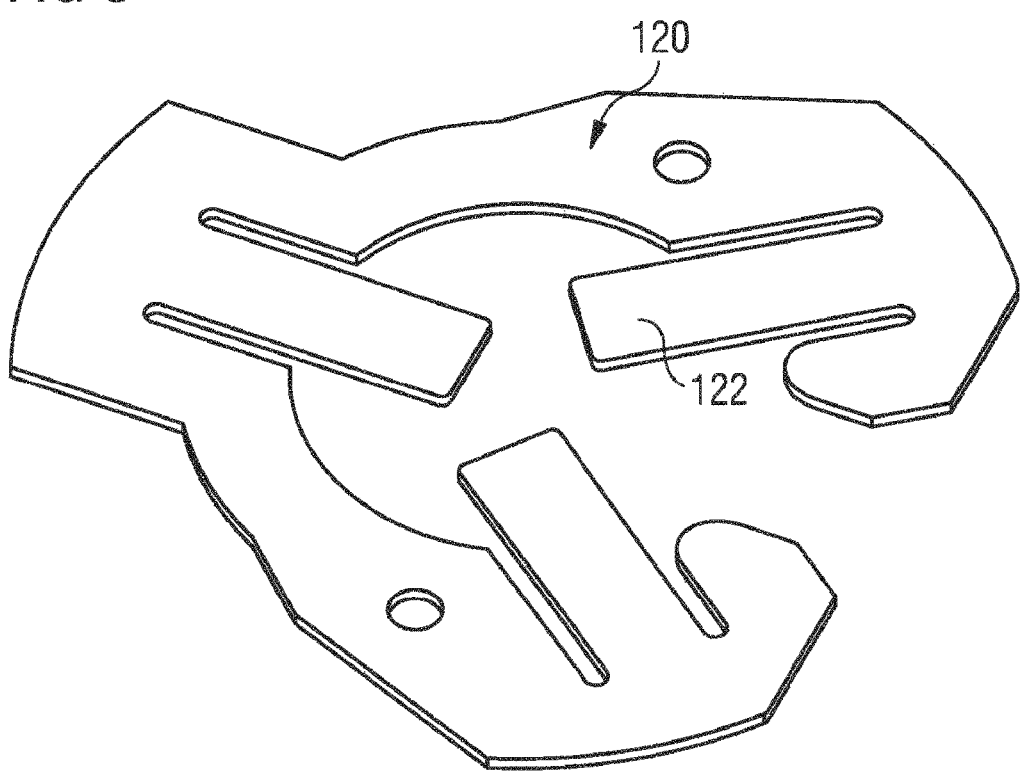
Figure 4:
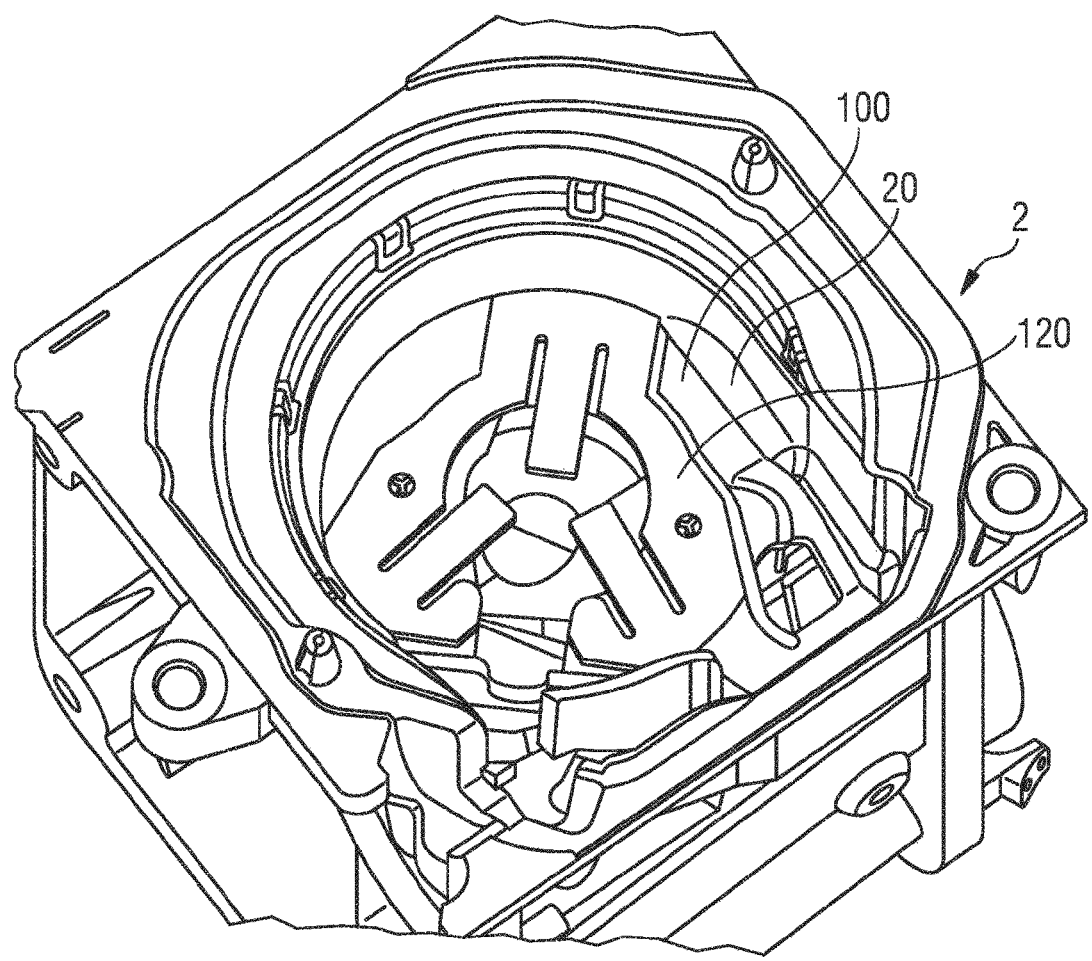
Figure 5:
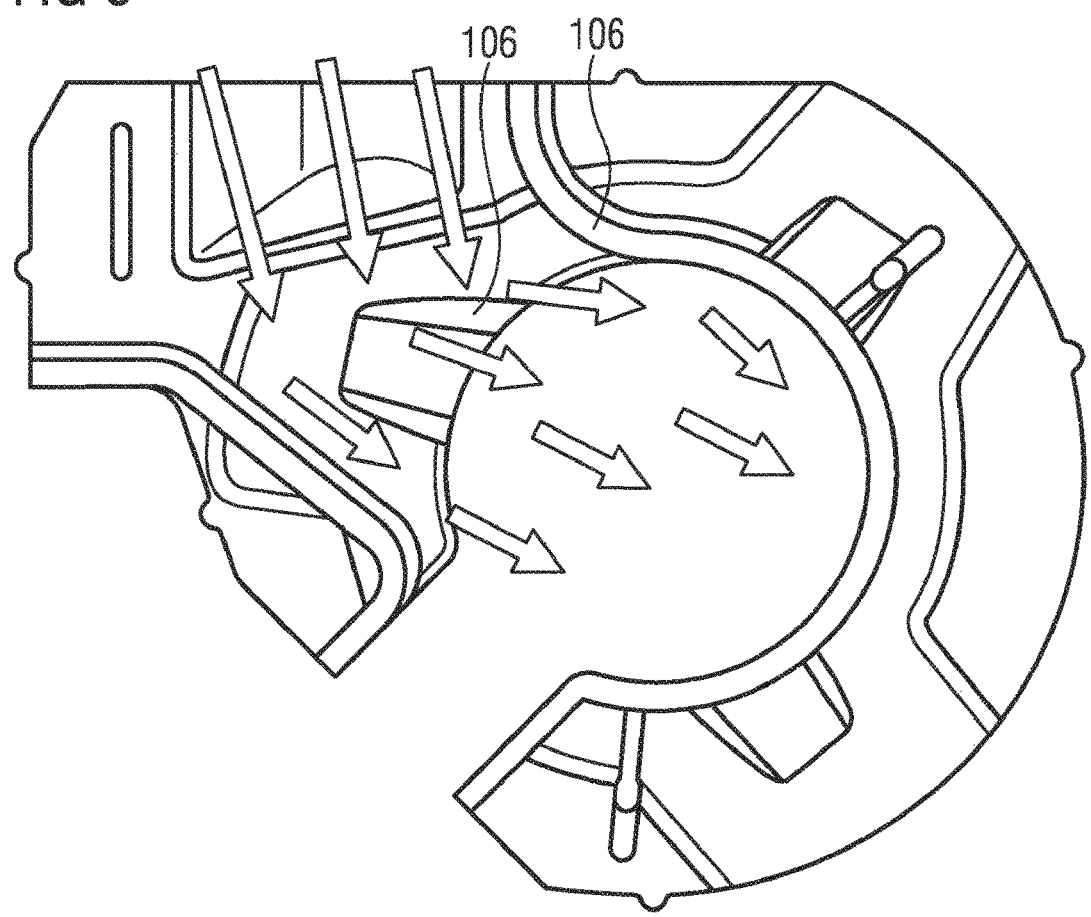
Figure 6:
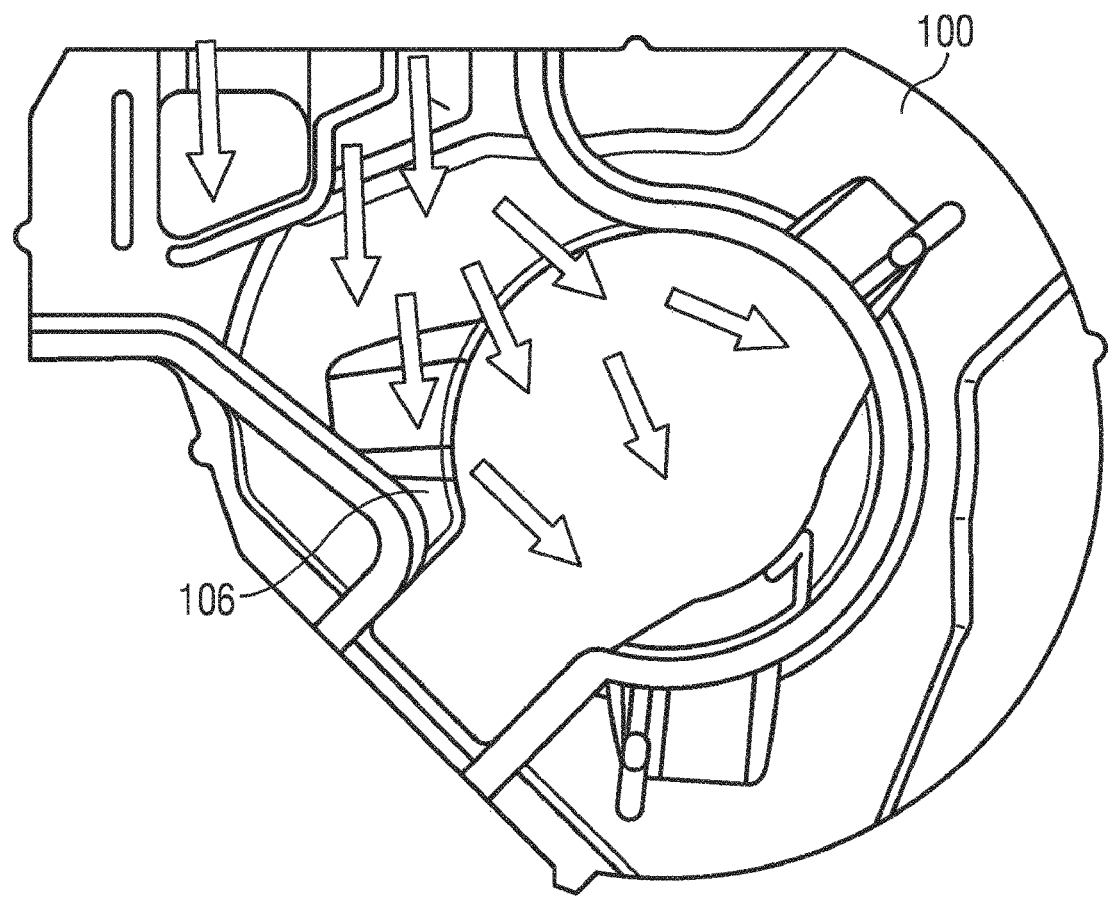

The disclosure is also explained in more detail below with respect to further features and advantages by means of the description of embodiments and with reference to the accompanying drawings. It shows in each case in a principle sketch:

FIG. 1 Heating apparatus according to the state of the art;
FIG. 2 first view of a flow-directing element;
FIG. 3 fastening element;
FIG. 4 view of an open heating apparatus;
FIG. 5 second view of a first embodiment of a flow-directing element;
FIG. 6 second view of a second embodiment of a flow-directing element; and
FIG. 7 second view of a third embodiment of a flow-directing element.

FIG. 2 shows a first view of a flow-directing element. This flow-directing element 100 has an outer border which is adapted to a receiving area in a combustion air vestibule. In an outer area, the flow-directing element 100 has an inflow region 102 which is adapted to the position of a blower. This is an eccentrically arranged blower.

Further, the flow-directing element 100 has a central outflow region 104 which allows air to pass from an underside of the flow-directing element 100 to an upper side of the flow-directing element. Guide elements 106 are disposed on the underside of the flow-directing element 100. The flow-directing element 100 may be, for example, a molded plastic part.

The flow-directing element 100 has a recess 108 for receiving a glow pin. Furthermore, a first recess 112 and a second recess 114 are shown in the upper side shown in FIG. 2. The first recess has a peripheral shape of the fastening element 120 shown in FIG. 3. The fastening element 120 can be inserted into the first recess 112 and second recesses 114. The fastening element 120 can be used to easily fasten the flow-directing element in the heating apparatus, in particular a blower vestibule or burner vestibule. This fastening element 120 has three protrusions which extend radially outwards. The second recesses 114 are configured for the three inwardly directed tongues 122 of the fastening element 120. The fastening element 120 does not have a closed shape in the peripheral direction, but has an opening which can be used to bring the fastening element 120 into position by means of a deformation. This opening is configured to be aligned with the recess 108 of the flow-directing element 100. Here, the fastening element is suitable for clamping the flow-directing element 100 as well as for supporting the flow-directing element 100 with two of the protrusions against a wall of the blower chamber 20. The fastening element 120 is preferably a spring element, which may for example be made of a spring steel.

FIG. 4 shows a view of an open heating apparatus with a flow-directing element 100 inserted in a combustion air vestibule 20 and a fastening element 120. An underside of the flow-directing element 100 rests on an upper side of a bottom of the combustion air vestibule 20. The fastening element 120 is disposed on the upper side of the flow-directing element 100. The fastening element 120 is thus arranged towards an evaporator burner receptacle or evaporator support, which is not shown. In particular, the tongues 122 of the fastening element 120 are configured to come into contact with a dome or bottom-side protrusion of the evaporator burner receptacle or evaporator holder, in the installed state. Due to the pressure of the bottom protrusion of the evaporator burner receptacle or evaporator holder on the tongues 122, the fastening element 120 configured as the spring element can be advantageously braced. With the aid of the fastening element 120, the flow-directing element 100 is thus held in the desired position.

Figure 7:
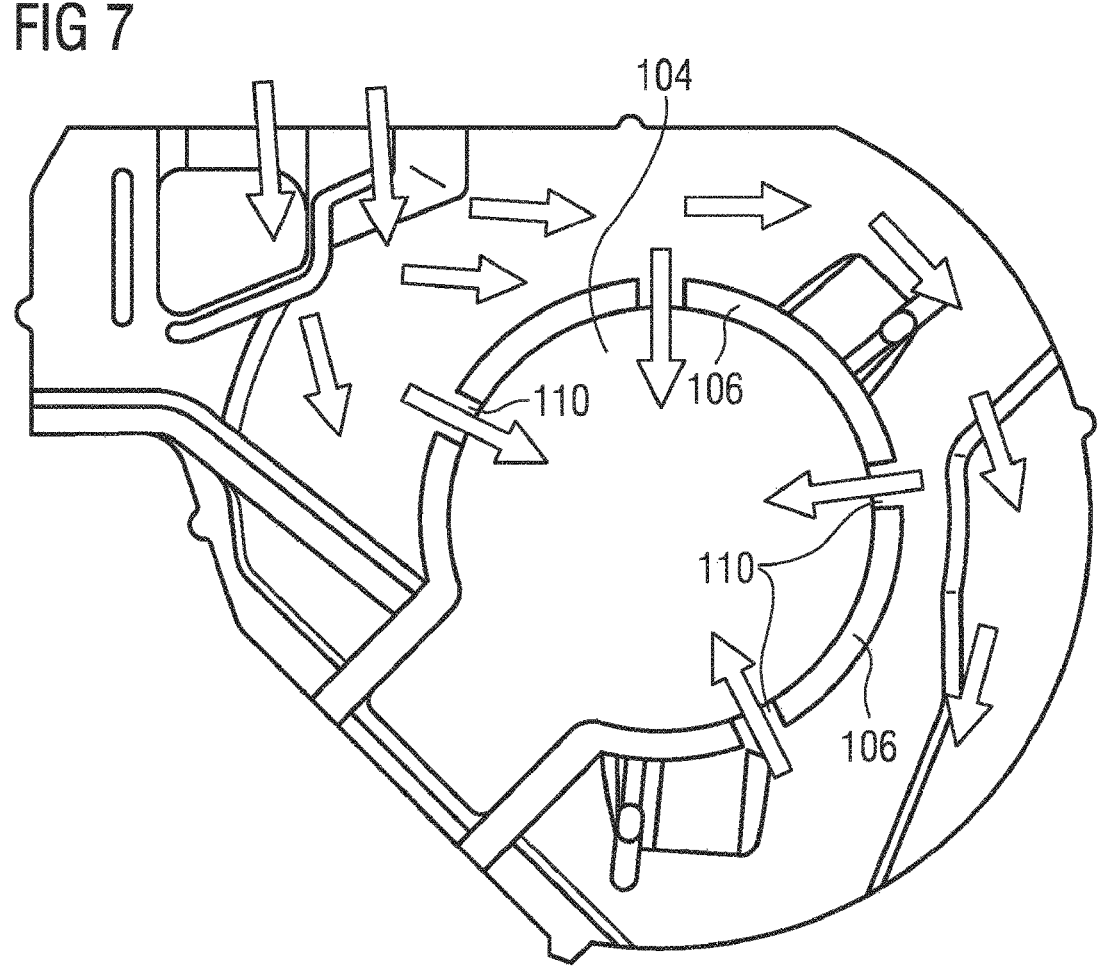

FIGS. 5 to 7 show various embodiments of an underside of a flow-directing element. The embodiment shown in FIG. 5 has, on the one hand, the upper-side recess for the tongue 122 of the fastening element 120 as a guide element 106. Further, it has a guide element 106 which is configured around the outflow region 104 as a circumferential wall. The guide elements 106 of this embodiment are designed to guide air from the inflow region 102 to the outflow region 104 along relatively short paths, thereby widening the air flow. As a result of this design, air is guided along very short paths to an evaporator receptacle disposed above the outflow region 104, so that strong cooling is achieved.

FIG. 6 shows another embodiment of the flow-directing element 100 from an underside. This flow-directing element 100 differs in particular in a deviating design of the guide element 106 arranged around the outflow region 104, which is also closed in the area of the recess 108.

FIG. 7 shows a further embodiment of the flow-directing element 100. This embodiment differs in that a guide element 106 arranged around the outflow region 104 forms a circumferential flow channel which is provided with openings 110. This flow channel with the openings 110 is suitable for guiding the air from different sides to the outflow region 104. As a result, a very uniform flow through the outflow region 104 is achieved and an evaporator receptacle arranged above the outflow region 104 can be cooled particularly uniformly.

REFERENCE NUMERALS 2 heating apparatus
4 evaporator burner
8 combustion chamber
10 evaporator receptacle
12 evaporator element
16 combustion air guide element
14 combustion chamber wall
18 gap
20 combustion air vestibule
22 combustion air passage openings
26 Bottom wall
24 combustion air inlet
36 feed tube
42 first flow path
44 exhaust gas discharge
46 second flow path
100 flow-directing element
102 inflow region
104 outflow region
106 guide element
108 recess
110 opening
112 first recess
114 second recess
120 fastening element
122 tongue
T thickness

The invention claimed is:

1. Flow-directing element for a heating apparatus having a body which comprises a laterally arranged inflow region on an underside of the flow-directing element, having a centrally arranged outflow region, which comprises a through-passage from an underside of the flow-directing element to an upper side of the flow-directing element, the upper side being located opposite the underside, and having at least one guide element which is arranged such that it allows flow to be guided from the inflow region to the outflow region, wherein the inflow region is designed as a bulge arranged in a portion of a circumferential outer border of the flow directing element, the bulge curving upward on the upper side of the outer border of the flow directing element and being open on an underside, wherein the bulge is configured to provide a conduit to direct a lateral flow of air received at the bulge toward the at least one guide element.

2. Flow-directing element according to claim 1, wherein the flow-directing element is a molded plastic part.

3. Flow-directing element according to claim 1, wherein the flow-directing element has a recess for inserting a glow plug.

4. Flow-directing element according to claim 1, wherein the inflow region is designed to accommodate a blower.

5. Flow-directing element according to claim 1, wherein the guide element or elements are designed to expand the air flow from the inflow region to the outflow region in a fan-like manner, and/or to divide the air flow from the inflow region and to guide a first part to the outflow region and to guide a further part around the outflow region in the peripheral direction and then to guide it radially inwards to the outflow region at one or more openings.

6. Flow-directing element according to claim 1, the flow-directing element having, on a side facing away from the guide element or elements, recesses for the insertion of a fastening element for fixing in a blower vestibule or combustion air vestibule of an evaporator burner.

7. Flow-directing system for a heating apparatus comprising a flow-directing element according to claim 1 and a fixing element.

8. Flow-directing system according to claim 7, wherein the fastening element is a spring element.

9. Heating apparatus with an evaporator burner with a blower vestibule or combustion air vestibule and an eccentric blower, comprising a flow-directing system according to claim 7.

10. Heating apparatus according to claim 9, wherein the flow-directing element is received in the blower space or combustion air vestibule in a self-centering manner.

11. Flow-directing element of claim 1, further comprising an evaporator burner.

12. Flow-directing element according to claim 2, wherein the flow-directing element is an injection molded plastic part.

13. Flow-directing element according to claim 3, wherein the recess is arranged on a side opposite the inflow region.

14. Flow-directing system for a heating apparatus according to claim 7, further comprising an evaporator burner.

15. Flow-directing system according to claim 8, wherein the spring element is formed from a spring steel.

16. A fuel operated heating apparatus for a vehicle, comprising:
  an eccentric blower; and
  the flow directing element according to claim 1.

* * * * *